United States Patent [19]

Benedetto et al.

[11] Patent Number: 5,005,898
[45] Date of Patent: Apr. 9, 1991

[54] VEHICLE STRUCTURE AND THE METHOD FOR ITS ASSEMBLY

[75] Inventors: Piero Benedetto, Murello; Salvatore Bezzi, Moncalieri; Paola Odone, Turin, all of Italy

[73] Assignee: Fiat Auto S.p.A., Turin, Italy

[21] Appl. No.: 452,744

[22] Filed: Dec. 21, 1989

[30] Foreign Application Priority Data

Dec. 23, 1988 [IT] Italy .............................. 68147 A/88

[51] Int. Cl.⁵ .......................................... B60K 37/00
[52] U.S. Cl. .................................... 296/194; 296/39.3; 296/70; 296/72; 296/197; 296/191
[58] Field of Search ............... 296/187, 194, 196, 197, 296/39.3, 70, 72, 191; 180/90

[56] References Cited

U.S. PATENT DOCUMENTS

| | | | |
|---|---|---|---|
| 4,083,595 | 4/1978 | Maier | 296/39.3 |
| 4,391,465 | 7/1983 | Piano | 296/194 X |
| 4,597,461 | 7/1986 | Köchy et al. | 296/194 X |
| 4,655,496 | 4/1987 | Gahlau et al. | 296/194 X |

FOREIGN PATENT DOCUMENTS

| | | | |
|---|---|---|---|
| 3622165 | 1/1988 | Fed. Rep. of Germany | 180/90 |
| 67794 A/80 | 5/1980 | Italy . | |
| 67969 A/83 | 9/1983 | Italy . | |
| 18538 | 1/1986 | Japan | 296/39.3 |
| 2129383 | 5/1984 | United Kingdom | 180/90 |

Primary Examiner—Margaret A. Focarino
Assistant Examiner—Gary C. Hoge
Attorney, Agent, or Firm—Shlesinger Arkwright & Garvey

[57] ABSTRACT

The vehicle structure comprises a body defining an engine compartment and a passenger compartment communicating with each other through an opening which the body defines between them, and a panel independent of the body and arranged to close said opening between the engine compartment and passenger compartment. The panel is composed of a rigid element having a mechanical support function and a soundproofing element of cellular structure, an instrument dashboard defining internally the ducts for an aeration system, and other accessories, all directly fixed to and supported by the panel to define with it a self-supporting sub-unit. The sub-unit is preassembled off the assembly line and is then fixed to the vehicle body by inserting it from the passenger compartment side so as to position the panel in the opening, and then fixing the panel to the body.

11 Claims, 3 Drawing Sheets

VEHICLE STRUCTURE AND THE METHOD FOR ITS ASSEMBLY

BACKGROUND OF THE INVENTION

This invention relates to a vehicle structure which can be partly preassembled, particularly a motor vehicle structure, and a method for the efficient, fast assembly of said structure.

The structure of a motor vehicle comprises the body defining the engine compartment and passenger compartment usually in the front and central part of the vehicle, a separation wall between the engine compartment and passenger compartment and usually constructed of sheet metal to form an integral part of the body, the so-called dashboard comprising the instrument panel and the ducts for the aeration system, and the various accessory elements such as the pedal unit, aeration system etc. These elements are all mounted on the separation wall between the passenger compartment and engine compartment, this wall therefore acting as the dash panel. A soundproofing element usually in the form of a sheet of expanded material is also mounted on said wall, for example on the side facing the passenger compartment.

It is apparent that the operations involved in assembling such a regulated structure are long and laborious, in particular because they have to be carried out manually by suitable personnel along the vehicle assembly line, with results which are consequently of unsatisfactory quality. In order to at least partly obviate this drawback, it is known from Italian patent application No. 67969 A/83 to mount the dash panel and the control elements (steering column, pedal unit etc.) and accessories on a cross-member off the assembly line and then mount this sub-unit on the assembly line on an otherwise conventional vehicle body, i.e. one in which the separation between the passenger compartment and engine compartment is obtained by a sheet metal bulkhead forming part of the body itself. However, such a method does not obviate the drawback of having to mount the soundproofing element on said separation bulkhead on the assembly line, this being a particularly difficult operation because of the limited space available to the operator.

From Italian patent application No. 67794 A/80 it is also known to provide separation between a motor vehicle engine compartment and passenger compartment by a combination of two independent plastics elements fixed peripherally one against the other on their respective concavity sides, the combination then being inserted to close the opening formed in the body between the engine compartment and passenger compartment. One of these elements is constructed of sound-absorbing material, the ducts for the aeration system being defined between the concavities of the two elements. With such a method it is not necessary to mount the normal soundproofing element as the sound absorption of said combination of elements is sufficient to provide good soundproofing of the passenger compartment.

On the other hand, this method necessarily requires the instrument and control panel to be mounted on the assembly line, requires the panel to be suitably shaped, and generally also requires a suitably shaped vehicle body, possibly provided with the necessary connection points for the controls and accessories which cannot be fixed directly to the combination of separation elements.

SUMMARY OF THE INVENTION

The object of the invention is to provide a vehicle structure, in particular for motor vehicles, which is of simple construction and assembly and which enables the greatest number of components to be premounted off the assembly line and specifically avoids the need to mount soundproofing elements between the passenger compartment and engine compartment on the assembly line.

Said object is attained according to the invention by a vehicle structure comprising a body defining an engine compartment and a passenger compartment communicating with each other through an opening which the body defines between them, a dividing element between the passenger compartment and engine compartment, an instrument dashboard and respective accessories and controls, characterized in that said dividing element consists of a panel independent of the body and arranged to close said opening between the engine compartment and passenger compartment, the panel being composed of a rigid element with a mechanical support function and a soundproofing element formed of expanded material of cellular structure, said soundproofing element forming a single body with the rigid element; said instrument dashboard and said accessories and controls being fixed to and supported by said panel to define with it a self-supporting sub-unit which is fixed perimetrally to the vehicle body by connection means.

The invention also relates to a method for forming a vehicle structure comprising a body defining an engine compartment and a passenger compartment communicating with each other through an opening which the body defines between them, a dividing element between the passenger compartment and engine compartment, an instrument dashboard and respective accessories and controls, characterized by comprising the following stages:

constructing a self-supporting panel composed of a rigid support element and a soundproofing element of cellular material formed integrally in a single piece with said rigid element;

mounting said instrument dashboard and said accessories and controls on said panel off the assembly line, to form a self-supporting sub-unit;

fixing said self-supporting sub-unit to said body by inserting the former into the passenger compartment, positioning the sub-unit so that said panel is inserted into and closes said communication opening between the engine compartment and passenger compartment, then permanently fixing the panel to the body by screws and perimetrally sealing any gaps between the panel and body opening.

BRIEF DESCRIPTION OF THE DRAWINGS

The invention will be more apparent from the non-limiting description of one embodiment thereof given hereinafter with reference to the accompanying drawings in which.

DETAILED DESCRIPTION OF THE INVENTION

Figure 1:
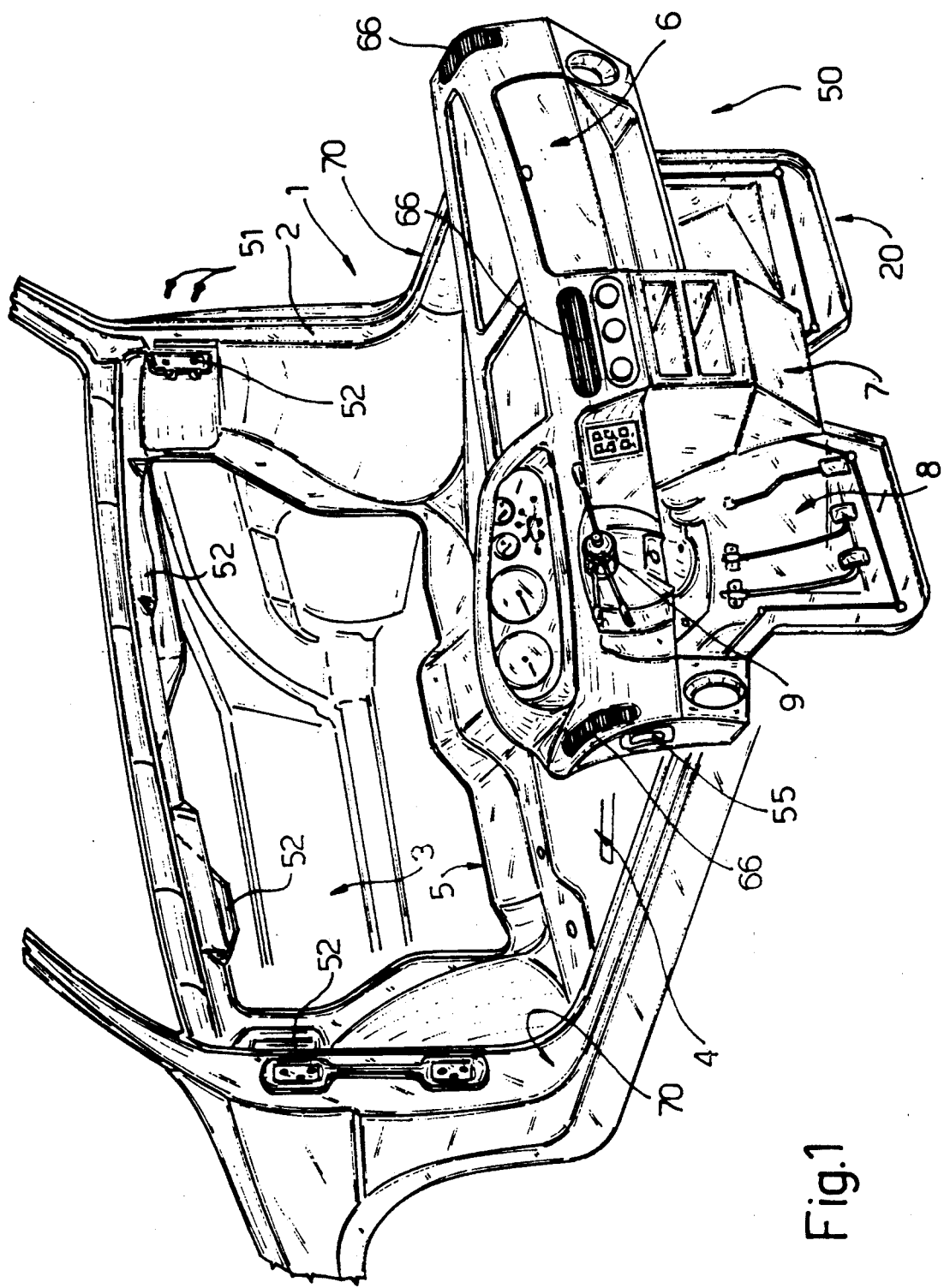
FIG. 1 shows a vehicle structure according to the invention.
Figure 2:
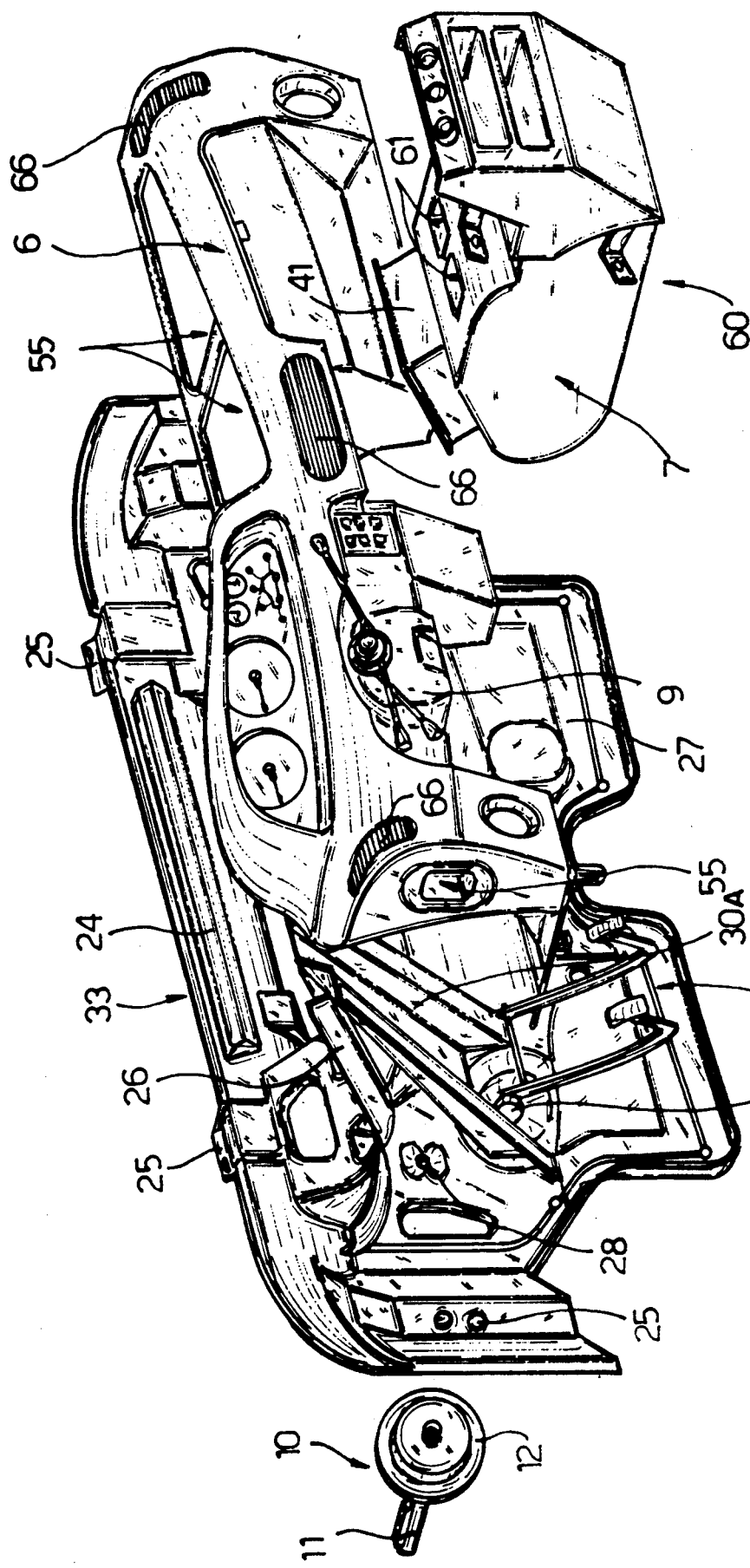
FIG. 2 shows one stage of the method according to the invention.
Figure 3:
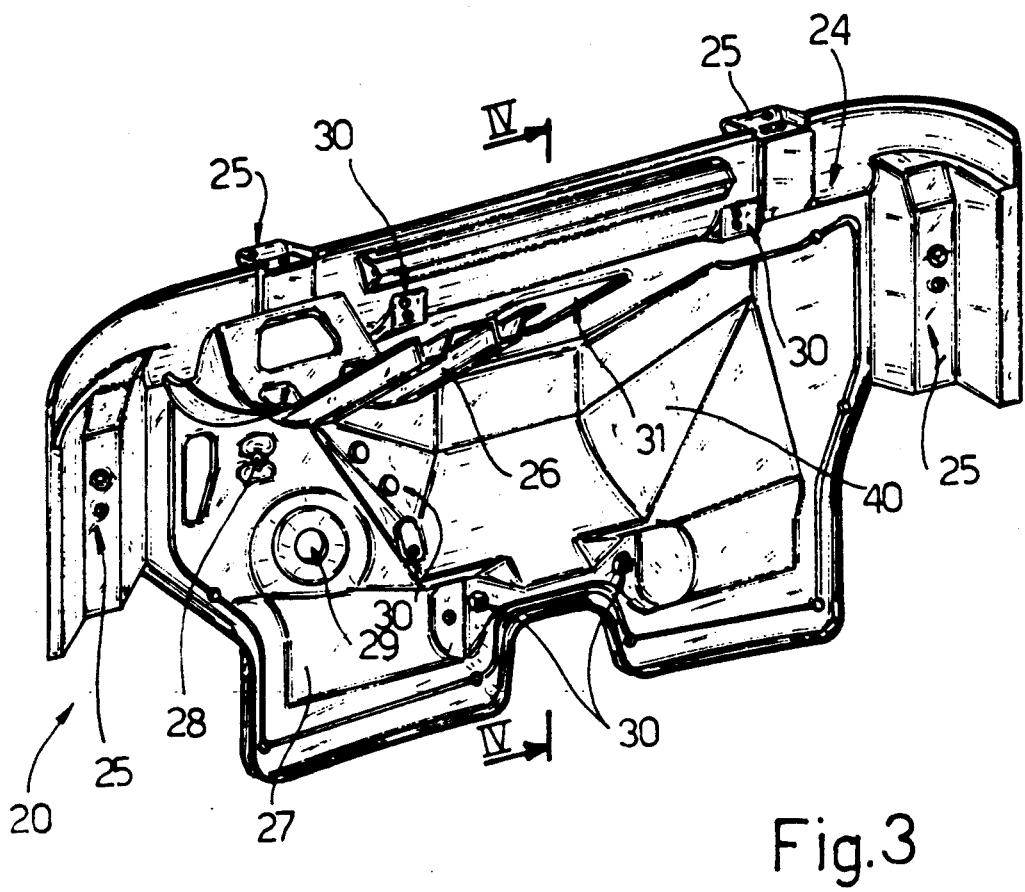
FIGS. 3 and 4 are respectively a perspective elevational view and a sectional view on the line IV—IV of a basic component element of the structure according to the invention.
Figure 4:
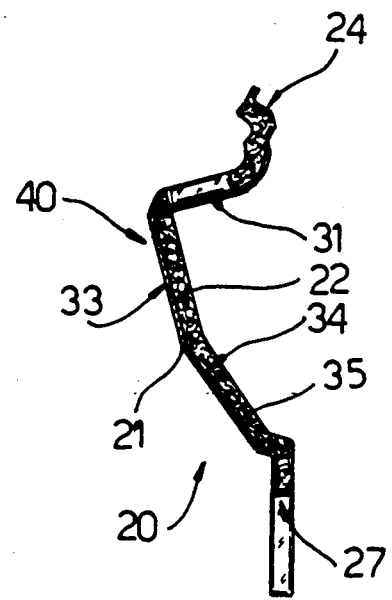

In FIGS. 1, 3 and 4 the reference numeral 1 indicates overall a vehicle structure comprising a body 2 defining internally an engine compartment 3 and a passenger compartment 4 communicating with each other through an opening 5 which the body defines between them, a dividing element between the passenger compartment 4 and engine compartment 3, an instrument dashboard 6 of known type and respective accessories and controls, which in this case (FIG. 2) comprise a known aeration device 7 for the vehicle passenger compartment 4 defined by the structure 1, for example an air conditioner, a pedal unit 8, a steering column 9 and a servo-brake device 10 comprising a master cylinder 11 and plenum chamber 12.

According to the invention, said dividing element between the engine compartment 3 and passenger compartment 4 consists of a panel 20 (FIGS. 3 and 4) formed as a part completely independent of the body 2 and shaped such as to close the opening 5 once mounted on the body 2. According to the invention the panel 20 comprises a rigid element 21 with a mechanical support function and a soundproofing element 22 constructed of expanded material of cellular structure, preferably with closed cells (such as polyurethane), said element 22 forming a single body with the rigid element 21, this latter defining in the panel 20 a load-bearing framework embedded in the soundproofing element 22 (FIG. 4).

The rigid element 21 is preferably formed by moulding a flame-resistant synthetic plastics material in known manner, but can also be of sheet metal construction. A synthetic plastics construction is however preferable because it enables the element to be shaped in any desired manner, without the mechanical limits imposed by technical requirements in the case of pressing sheet metal. In any event, being constructed of flame-resistant material it is perfectly able to also act as a fireproof bulkhead, a function which in known vehicles is performed by elements of the body. The soundproofing element 22 is formed integral in a single piece with the element 21. This can be attained by constructing the two elements separately and then joining them together without substantially leaving any empty space between them, for example by means of adhesive, or preferably by constructing the two elements 21 and 22 by co-moulding (or if the element 21 is of sheet of metal, by pressing the element 22 over it), by well known methods possible applied in other fields.

The panel 20 comprises an upper portion 24 formed substantially as a cross-member and provided integrally with respective brackets 25 for connection to the vehicle body 2 and with at least one respective bracket 26 for supporting the instrument dashboard 6; and a lower portion 27 of bulkhead shape provided with respective passage holes 28 and 29 and with connection means 30 for said vehicle controls and accessories and for the dashboard 6. In particular, the holes 28 and 29 allow the servobrake device 10 and steering column 9 to be mounted. The mechanical part of this latter can be supported in known manner by a bracket 30A lowerly supporting the pedal unit 8 and directly fixed and supported on the panel 20.

This latter is also provided with a substantially rectangular through aperture 31 between the upper cross-member portion 24 and the lower bulkhead portion 27. According to a preferred embodiment of the invention the element 22 is shaped in such a manner as to cover that side 33 of the rigid element 21 facing the engine compartment 3 only over substantially the entire upper portion 24 of the panel 20 and as far as the extent of the aperture 31, and to cover that side 34 of the element 21 facing the passenger compartment 4 over substantially the entire lower portion 35 of the element 21 below the aperture 31. In this manner, the bulkhead portion 27 of the panel 20 is bounded towards the engine compartment 3 directly by the face 33 of the rigid element 21 constructed of flame-resistant material, and can therefore act as a flameproof bulkhead without this in any way impairing the operation of the soundproofing element. On the other hand the region in which the most damaging noise transmission can take place (in that it can directly affect the dashboard 6), i.e. the upper portion 24 of the panel 20, is bounded towards the engine compartment 3 directly by the soundproofing element 22, with the result that attenuation is a maximum in this region. This particular structure of the panel 20 also has the advantage that the dashboard 6 can be mounted directly against the face 34 of the rigid element 21, with a mounting accuracy which is much greater than that possible if it were mounted directly on an expanded element such as the element 22. This does not mean, bearing in mind the probable progress still to be made in the field of synthetic plastic resins, that the soundproofing element 22 cannot be formed entirely on the side facing the passenger compartment 4, or entirely on the side facing the engine compartment 3, according to circumstances and using embodiments not illustrated for simplicity, in other words to totally cover either the face or the face 33 alone.

According to a further characteristic of the invention, the panel 20 is substantially of T-shape perimetrally and comprises a central protuberance 40 of substantially prismatic form which projects into the engine compartment 3 such that its concavity faces the passenger compartment 4. The protuberance 40 is shaped to be able to house in its cavity the aeration device 7 and is provided upperly with the aperture 31, which when in use engages an intake mouth 41 of the aeration device 7.

From the description it is apparent that a further basic characteristic of the vehicle structure according to the invention is that the instrument dashboard 6 and the accessories and controls 7, 8, 9 are directly fixed and supported on the panel 20, to define with it a self-supporting sub-unit indicated overall by 50 in FIG. 1, which is fixed perimetrally to the body 2 in a position corresponding with the opening 5, for example by connection means in the form of screws 51. By means of these latter the panel 20, on which the dashboard 6, the pedal unit 8, the steering column 9, the servo-brake 10 and the air conditioner 7 are preassembled by means of the holes 28, 29 and the connection means 26 and 30, is fixed by the brackets 25 to corresponding connection rackets 52 provided on the vehicle body 2 along the perimeter of the opening 5. Finally, according to the invention the dashboard 6 defines internally respective known ducts 55 for a vehicle aeration system defined by the structure 1, the assembly of ducts 55, the aperture 31 in the panel 20, the mouth 41, the device 7, respective delivery ports 61 of this latter and respective delivery ports 62 carried externally by the dashboard 6.

By operating according to the invention, the described vehicle structure 1 is very simple, economical and rapid to produce. Specifically, the body 2 provided with the opening 5 and brackets 52 is constructed in conventional manner, whereas the self-sporting panel 20 is constructed separately by co-moulding its elements 21 and 22 from two different synthetic plastics materials, of which at least one is flame-resistant, so that said elements become combined into a single integral piece. The dashboard 6 and all the necessary accessories and controls (such as the steering column 9, pedal unit 8, devices 7 and servo-brake 10) are then mounted on the panel 20 off the assembly line, for example in a specially provided assembly department or by an external supplier, so forming the self-sporting sub-unit 50. Finally, after possible testing off the line, the sub-unit 50 is fixed to the body 2 by inserting the sub-unit 50 into the passenger compartment 2 by inserting the sub-unit 50 into the passenger compartment 2, for example through respective door spaces 70, positioning the sub-unit 50 such that the panel is inserted into and closes the opening 5, and then permanently fixing the panel 20 to the body 2 for example by screws 51 followed by sealing any perimetral gaps present between the panel 20 and body 2, for example using strips of any sealant adhesive of known type normally used in vehicle body building.

The advantages of the invention are apparent from the aforegoing description. Because of the particular structure of the panel 20 and the described constructional sequence, a vehicle structure is obtained which is of great simplicity and economy in terms of its construction and assembly, and on which the normal currently used dashboards can be used, and which further avoids the need for assembly line mounting of soundproofing elements between the engine compartment and passenger compartment while still ensuring perfect soundproofing of this latter. The dashboard with all controls and accessories can be assembled off the assembly line to obtain a sub-unit which can then be mounted on the vehicle body while on the assembly line by means of simple movements which are such as to make it possible to use a robotised automatic assembly cycle.

We claim:

1. A vehicle structure, comprising:
   (a) a body defining an engine compartment and a passenger compartment communicating with each other through an opening between them;
   (b) a dividing element between the passenger compartment and engine compartment;
   (c) said dividing element comprising a panel independent of said body and arranged to close said opening between the engine compartment and passenger compartment;
   (d) said panel comprising a rigid element having a mechanical support function and a soundproofing element formed of expanded material of cellular structure;
   (e) said soundproofing element forming a single body with said rigid element;
   (f) said panel including an upper portion of cross-member form and a lower portion of bulkhead form;
   (g) said rigid element defining a load-bearing framework of said panel and being embedded in said soundproofing element; and
   (h) said soundproofing element covering said upper portion of said panel on a side facing the engine compartment and said lower portion on a side facing the passenger compartment.

2. A vehicle structure as in claim 1, wherein:
   (a) said upper portion includes means for connecting said panel to said body and a support bracket means for connecting an instrument dashboard to said panel.

3. A vehicle structure as in claim 1, wherein:
   (a) said lower portion includes passage holes and connection means for vehicle controls and accessories.

4. A vehicle structure as in claim 1, wherein:
   (a) said panel includes a through aperture disposed between said upper and lower portions.

5. A vehicle structure as in claim 1, wherein:
   (a) an instrument dashboard is secured to and supported by said panel; and
   (b) said instrument dashboard defines internally the ducts for a vehicle aeration system.

6. A vehicle structure as in claim 1, wherein:
   (a) said rigid element is formed of a molded flame-resistant synthetic plastic material; and
   (b) said soundproofing element is co-molded on said rigid element so as to be integral with said rigid element.

7. A vehicle structure as in claim 1, wherein:
   (a) said panel is substantially T-shaped perimetrally and comprises a central protuberance projecting into the engine compartment such that its concavity faces the passenger compartment;
   (b) said protuberance is shaped to be able to house in its cavity an aeration device for the vehicle passenger compartment; and
   (c) said aperture cooperates with an intake mouth of the aeration device.

8. A vehicle structure, comprising:
   (a) a body defining an engine compartment and a passenger compartment communicating with each other through an opening between them;
   (b) a dividing element between the passenger compartment and the engine compartment, said dividing element including an instrument dashboard;
   (c) said dividing element including a panel independent of said body and arranged to close said opening between the engine compartment and passenger compartment;
   (d) said panel being composed of a rigid element having a mechanical support function and a soundproofing element formed of expanded material of cellular structure;
   (e) said soundproofing element forming a single body with said rigid element;
   (f) said instrument dashboard being fixed to and supported by said panel to define therewith a self-supporting sub-unit which is fixed perimetrally to said vehicle body;
   (g) said panel comprising an upper portion substantially in the form of a cross-member and including bracket means for connecting to said vehicle body and at least one support bracket means for securing said instrument dashboard thereto, and a lower portion of bulkhead form having passage holes and connection means for vehicle controls and accessories;
   (h) said panel including a through aperture substantially between said upper cross-member portion and said lower bulkhead portion;
   (i) said rigid element defining a load-bearing framework of said panel which is embedded in said soundproofing element; and (j) said soundproofing element being shaped in such a manner as to cover said rigid element on a side facing said engine compartment over the entire upper portion of said panel and as far as the extent of said aperture, and on a side facing said passenger compartment over the entire portion of said rigid element below said aperture.

9. A vehicle structure as in claim 8, wherein:
(a) said instrument dashboard defines internally ducts for a vehicle aeration system.

10. A vehicle structure as ian claim 8, wherein:
(a) said rigid element is formed of a molded flame-resistant synthetic plastic material; and (b) said soundproofing element is co-molded on said rigid element so as to be integral and form a single piece with said rigid element.

11. A vehicle structure as in claim 8, wherein:
(a) said panel is substantially T-shaped perimetrally and comprises a central protuberance which projects into the engine compartment such that its concavity faces the passenger compartment;
(b) said protuberance is shaped to house in its cavity an aeration device for the vehicle passenger compartment; and
(c) said aperture cooperates with an intake mouth of the aeration device.

* * * * *